US008402229B1

(12) United States Patent
Wilt et al.

(10) Patent No.: US 8,402,229 B1
(45) Date of Patent: Mar. 19, 2013

(54) SYSTEM AND METHOD FOR ENABLING INTEROPERABILITY BETWEEN APPLICATION PROGRAMMING INTERFACES

(75) Inventors: Nicholas Patrick Wilt, Rochester, NY (US); Ian A. Buck, San Jose, CA (US); Nolan David Goodnight, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 767 days.

(21) Appl. No.: 12/031,682

(22) Filed: Feb. 14, 2008

(51) Int. Cl.
*G06F 13/16* (2006.01)

(52) U.S. Cl. ......................... 711/152; 711/150; 711/151

(58) Field of Classification Search ......................... None
See application file for complete search history.

(56) References Cited

U.S. PATENT DOCUMENTS

| | | | | |
|---|---|---|---|---|
| 5,842,015 | A * | 11/1998 | Cunniff et al. | 718/104 |
| 2008/0276220 | A1 * | 11/2008 | Munshi et al. | 717/119 |
| 2008/0276261 | A1 * | 11/2008 | Munshi et al. | 719/328 |
| 2008/0276262 | A1 * | 11/2008 | Munshi et al. | 719/328 |
| 2008/0307139 | A1 * | 12/2008 | Thomas | 710/244 |

FOREIGN PATENT DOCUMENTS

| | | |
|---|---|---|
| WO | WO 2008/127610 | 10/2008 |
| WO | WO 2008/127622 | 10/2008 |
| WO | WO 2008/127623 | 10/2008 |

OTHER PUBLICATIONS

Yongming Xie; CUDA OpenGL Tutorial; http://appsrv.cse.cuhk.edu.hk/~ymxie/CUDA/; Feb. 26, 2007; 4 pages.*

Eggers, et al., "Simultaneous Multithreading: A Platform for Next-Generation Processors," *IEEE Micro*, vol. 17, No. 5, pp. 12-19, Sep./Oct. 1997.

Moss, et al. "Toward Acceleration of RSA Using 3D Graphics Hardware," LNCS 4887, Dec. 2007, pp. 369-388.

Office Action for U.S. Appl. No. 12/031,678, dated Oct. 31, 2011.

The Interprocess Communication (IPC) Overview; http://kalwin.fr/unix/add_hoc/techdocs/90605205814708.html; Oct. 12, 2011; 6 pages.

* cited by examiner

*Primary Examiner* — Than Nguyen
(74) *Attorney, Agent, or Firm* — Patterosn & Sheridan, LLP

(57) ABSTRACT

One embodiment of the present invention sets forth a method for sharing graphics objects between a compute unified device architecture (CUDA) application programming interface (API) and a graphics API. The CUDA API includes calls used to alias graphics objects allocated by the graphics API and, subsequently, synchronize accesses to the graphics objects. When an application program emits a "register" call that targets a particular graphics object, the CUDA API ensures that the graphics object is in the device memory, and maps the graphics object into the CUDA address space. Subsequently, when the application program emits "map" and "unmap" calls, the CUDA API respectively enables and disables accesses to the graphics object through the CUDA API. Further, the CUDA API uses semaphores to synchronize accesses to the shared graphics object. Finally, when the application program emits an "unregister" call, the CUDA API configures the computing system to disregard interoperability constraints.

22 Claims, 8 Drawing Sheets

SYSTEM AND METHOD FOR ENABLING INTEROPERABILITY BETWEEN APPLICATION PROGRAMMING INTERFACES

BACKGROUND OF THE INVENTION

1. Field of the Invention

The present invention relates generally to the field of computer processing and more specifically to a system and method for enabling interoperability between application programming interfaces (APIs).

2. Description of the Related Art

A typical computing system includes a host, such as a central processing unit (CPU), and a compute device, such as a graphics processing unit (GPU). Some compute devices are capable of very high performance using a relatively large number of small, parallel execution threads on dedicated programmable hardware processing units. The specialized design of such compute devices allows these compute devices to perform certain tasks, such as rendering 3-D scenes and tessellation, much faster than a host. However, the specialized design of these compute devices also limits the types of tasks that the compute devices can perform. The host is typically a more general-purpose processing unit and therefore can perform most tasks. Consequently, the host usually executes the overall structure of software application programs and configures the compute device to perform specific data-parallel, compute-intensive tasks.

To fully realize the processing capabilities of advanced compute devices, compute device functionality may be exposed to application developers through one or more application programming interfaces (APIs) of calls and libraries. Among other things, doing so enables application developers to tailor their application programs to optimize the way compute devices function. Typically, each API is designed to expose a particular set of hardware features, and is suitable for a specific set of problems. For example, in some compute devices, a graphics API enables application developers to tailor their application programs to optimize the way those compute devices process graphics scenes and images. Similarly, in some compute devices, a compute API enables application developers to tailor their application programs to optimize the way those compute devices execute high arithmetic intensity operations on many data elements in parallel. Some application programs include algorithms that are most efficiently implemented by using a graphics API to perform some tasks and a computation API to perform other tasks.

In one approach to developing such an application program, the application developer implements a computation algorithm using the compute API and implements subsequent graphics operations that utilize the output of the computation algorithm using the graphics API. To allow the graphics API to consume the data written via the compute API, the application developer copies the data from the memory associated with the compute API to the host memory. The application developer then submits this data via the graphics API, thereby copying the data from the system memory into graphics objects associated with the graphics API. One drawback to this approach is that the application program allocates three buffers and makes two copies of the data that is accessed by both the compute API and the graphics API. Allocating and copying buffers in this fashion may reduce the speed with which the host and compute device execute the application program and, consequently, may hinder overall system performance.

As the foregoing illustrates, what is needed in the art is a more efficient and flexible technique for enabling APIs to inter-operate.

SUMMARY OF THE INVENTION

One embodiment of the present invention sets forth a method for accessing a shared memory in a system having multiple application programming interfaces (APIs). The method includes the steps of registering a memory buffer for address mapping to allow the memory buffer to be accessed by a plurality of APIs, requesting access to the memory buffer, synchronizing access to the memory buffer among two or more of the APIs in the plurality of APIs using a semaphore mechanism for purposes of accessing the memory buffer, and generating one or more calls that cause a processing unit to operate on data stored in the memory buffer.

One advantage of the disclosed method is that mapping a graphics object into a CUDA address space allows application programs to use both a graphics API and a CUDA API to access the data in the graphics object without allocating additional buffers or copying data. Moreover, using the one or more semaphore mechanisms to synchronize access to the graphics object enables the compute device to efficiently ensure exclusive access to the graphics object.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
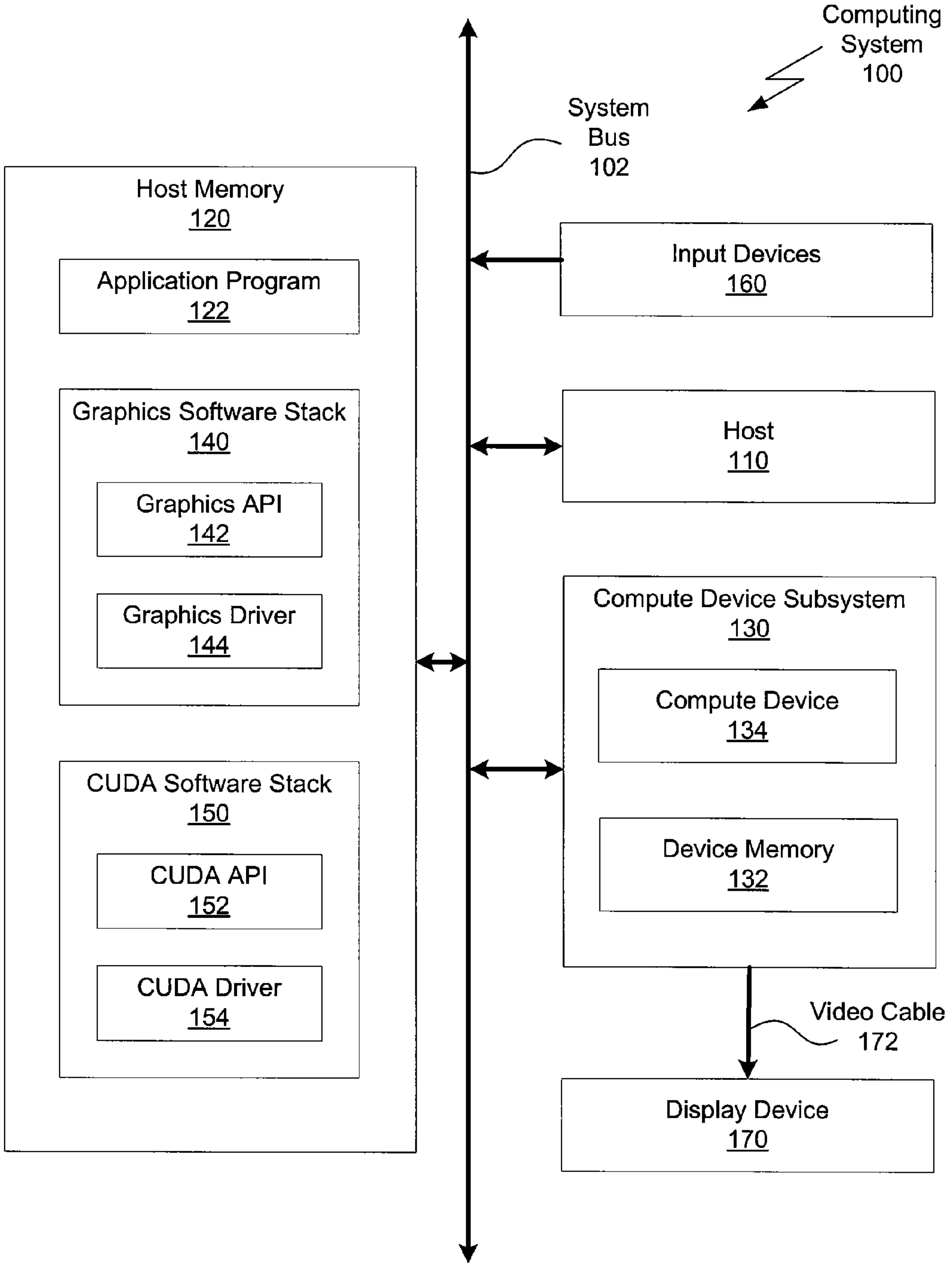
FIG. 1 is a conceptual diagram of a computing system in which one or more aspects of the invention may be implemented.

FIG. 1 is a conceptual diagram of a computing system 100 in which one or more aspects of the invention may be implemented. As shown, the computing system 100 includes a host

110 (e.g., a central processing unit), input devices 160, a host memory 120, a compute device subsystem 130 (e.g., a graphics processing subsystem), and one or more display devices 170. In alternate embodiments, the host and portions of the compute device subsystem may be integrated into a single processing unit. Further, the functionality of the compute device subsystem may be included in a chipset or in some other type of special purpose processing unit or co-processor. In some embodiments, the computing system may include more or less than one compute device subsystem. Communication paths interconnecting the various components in FIG. 1 may be implemented using any suitable bus or point-to-point communication protocol(s), and connections between different devices may use different protocols as is known in the art.

The host 110 connects to the input devices 160, the host memory 120, and the compute device subsystem 130 via a system bus 102. In alternate embodiments, the host memory 120 may connect directly to the host 110. The host 110 receives user input from the input devices 160, executes programming instructions stored in the host memory 120, operates on data stored in the host memory 120, and configures the compute device subsystem 130 to perform specific data-parallel, compute-intensive tasks. The host memory 120 typically includes dynamic random access memory (DRAM) used to store programming instructions and data for processing by the host 110 and the compute device subsystem 130. The compute device subsystem 130 receives instructions that are transmitted by the host 110 and processes the instructions in order to perform data-parallel, compute-intensive tasks, such as tessellation and rendering graphics images. Subsequently, the compute device subsystem 130 may transmit rendered graphics images through one or more video cables 172 to one or more display devices 170. Each display device 170 is an output device capable of emitting a visual image corresponding to an input graphics image.

The host memory 120 includes a graphics software stack 140, a compute unified device architecture (CUDA) software stack 150, and one or more application programs 122. The graphics software stack 140 is a set of programs that issue and manage specific tasks in the graphics pipeline (the collection of processing steps performed to transform 3-D images into 2-D images) that operate on components in the compute device subsystem 130. The CUDA is a general-purpose computing environment which uses the compute device subsystem 130 to perform various computing tasks. The CUDA software stack 150 is a set of programs included in the CUDA that issue and manage general-purpose computations that operate on components in the compute device subsystem 130.

The graphics software stack 140 includes a graphics API 142 and a graphics driver 144, and the CUDA software stack 150 includes a CUDA API 152 and a CUDA driver 154. The application program 122 generates calls to the graphics API 142, the CUDA API 152, or any combination thereof in order to produce a desired set of results. A portion of the graphics API 142 functionality is implemented within the graphics driver 144. Similarly, a portion of the CUDA API 152 functionality is implemented within the CUDA driver 154. Both the graphics driver 144 and the CUDA driver 154 are configured to translate high-level instructions into machine code commands that execute on components within the compute device subsystem 130. In alternate embodiments, the CUDA software stack and/or the graphics software stack may be replaced with any set of software programs that expose and manage compute device functionality. For example, the CUDA software stack may be replaced with a different general-purpose compute API and associated driver, or another graphics API and associated driver.

The compute device subsystem 130 includes a compute device 134, such as a graphics processing unit, and a device memory 132. The compute device 134 receives and processes instructions transmitted from the graphics driver 144 and the CUDA driver 154. The compute device 134 includes one or more streaming multiprocessors (not shown). Each of the streaming multiprocessors is capable of executing a relatively large number of threads (i.e., part of a program) concurrently. Further, each of the streaming multiprocessors can be programmed to execute processing tasks relating to a wide variety of applications, including but not limited to linear and nonlinear data transforms, filtering of video and/or audio data, modeling operations (e.g., applying of physics to determine position, velocity, and other attributes of objects), and so on.

The device memory 132 typically includes DRAM and is used to store data and programming that requires relatively fast access by the compute device 134. Components in both the graphics software stack 140, such as the graphics API 142 and the graphics driver 144, and the CUDA software stack 150, such as the CUDA API 152 and the CUDA driver 154, access the device memory 132. Moreover, the compute device 134 may be configured to synchronize the commands emitted by the graphics driver 144 and the CUDA driver 154 to ensure that the drivers 144 and 154 have mutually exclusive access to the same location in device memory 132. The compute device 134 may be provided with any amount of device memory 132, and may use the device memory 132 and the host memory 120 in any combination for memory operations. In alternate embodiments, the device memory may be incorporated into the host memory.

Figure 2:
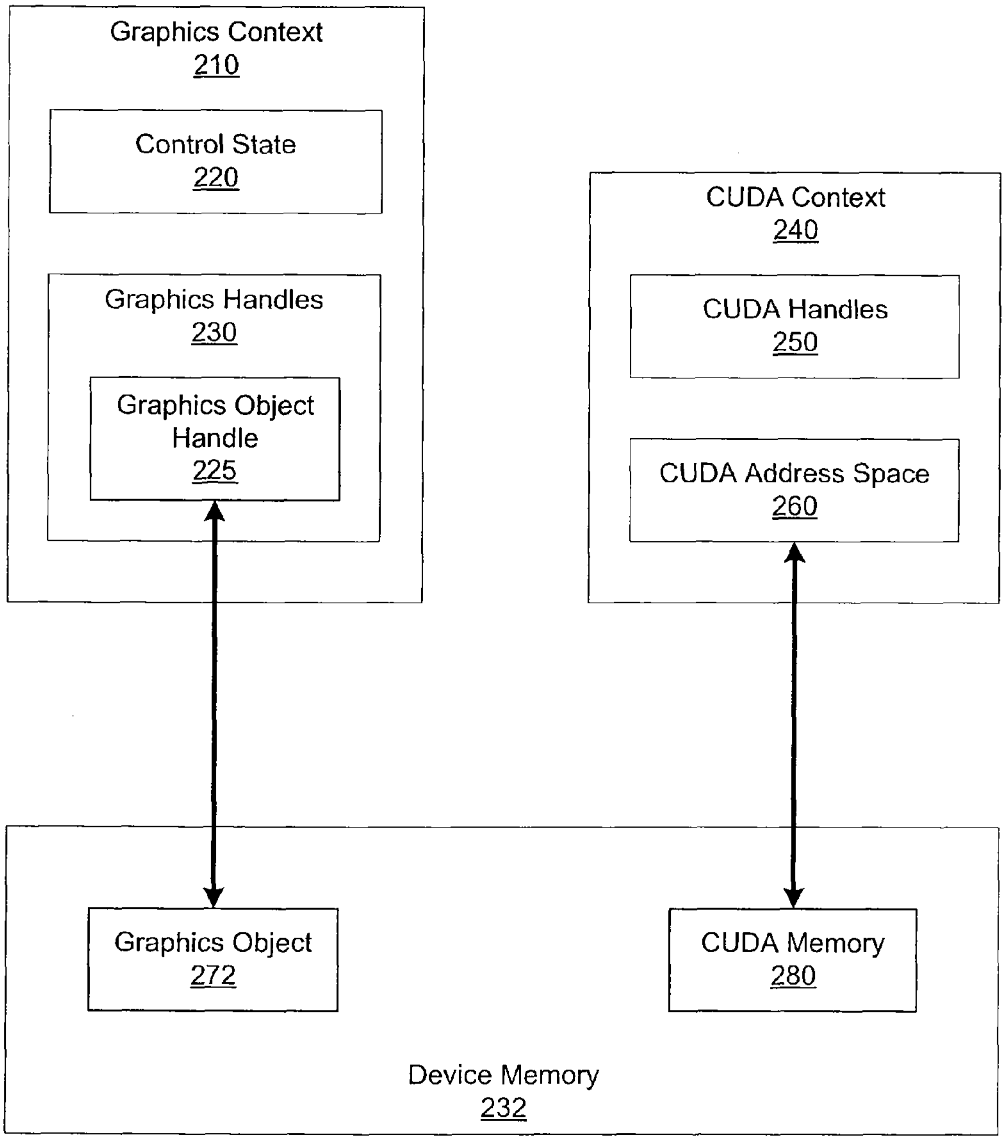
Figure 2 (prior art)
FIG. 2 is a conceptual diagram of a graphics context, a compute unified device architecture (CUDA) context, and a device memory of an exemplary prior art computing system.

FIG. 2 is a conceptual diagram of a graphics context 210, a CUDA context 240, and a device memory 232 of an exemplary prior art computing system. Resources and actions performed within a graphics API are typically encapsulated inside a particular graphics context 210. Similarly, resources and actions performed within a CUDA API are typically encapsulated inside a particular CUDA context 240. There may be more or less than one graphics context 210 and more or less than one CUDA context 240.

The graphics context 210 includes a graphics control state 220 and graphics handles 230. The graphics control state 220 includes information regarding the state of the compute device. The graphics handles 230 include resources such as buffer objects or vertex buffers. The CUDA context 240 includes CUDA handles 250 that are used for resource management, such as module handles and object handles, and a CUDA address space 260. The device memory 232 includes a graphics object 272 that is accessible through the graphics API, and a CUDA memory 280 that is accessible through the CUDA API.

As shown, the graphics handles 230 include a graphics object handle 225 that references the graphics object 272 in the device memory 232. Similarly, the CUDA address space 260 references the CUDA memory 280 in the device memory 232. The graphics object 272 is suitable for processing by the CUDA. However, in the prior art computing system, the CUDA API cannot access the graphics object 272 directly.

Figure 3A:
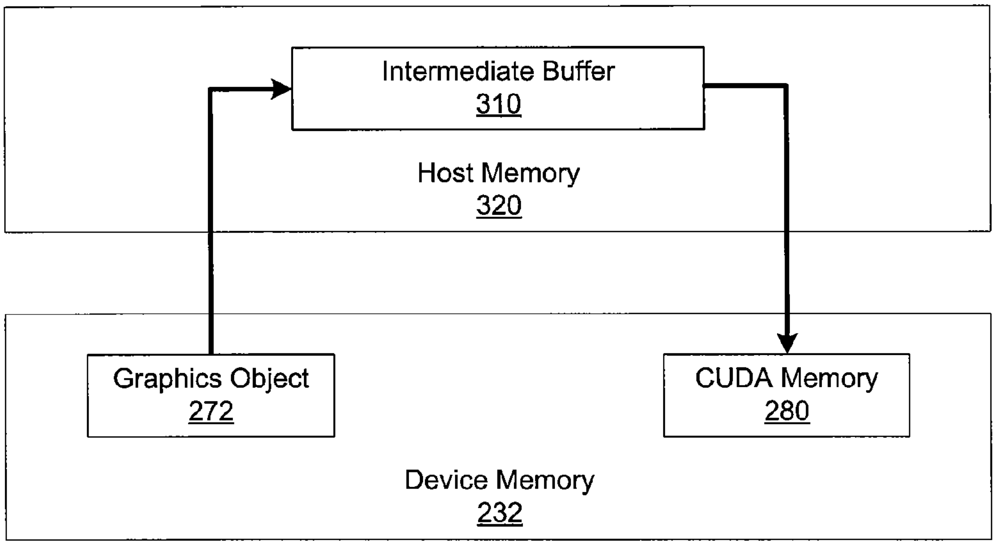
Figure 3A (prior art)
FIGS. 3A and 3B are conceptual diagrams of the prior art device memory of FIG. 2 and a host memory of the exemplary prior art computing system.
Figure 3B:
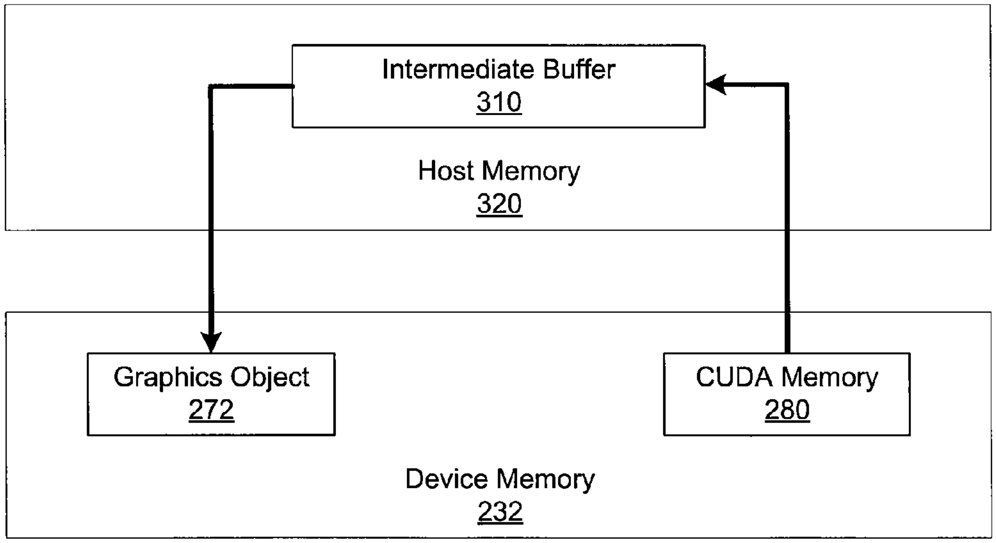
Figure 3B (prior art)

FIGS. 3A and 3B are conceptual diagrams of the device memory 232 of FIG. 2 and a host memory 320 of the exemplary prior art computing system. The host memory 320 includes an intermediate buffer 310.

As shown in FIG. 3A, to allow the CUDA API to access the graphics object 272 in prior art computing systems, the application developer first allocates the intermediate buffer 310 in the host memory 320 and sufficient CUDA memory 280 in the device memory 232. The application developer then copies the graphics object 272 from the device memory 232 to the intermediate buffer 310. Finally, the application developer copies the intermediate buffer 310 to the CUDA memory 380.

Similarly, as shown in FIG. 3B, to allow the graphics API to access data in the CUDA memory 280 in prior art computing systems, the application developer first allocates the intermediate buffer 310 in the host memory 320 and the graphics object 272 in the device memory 232. The application developer then copies the appropriate data from the CUDA memory 280 to the intermediate buffer 310. Finally, the application developer uses the graphics API to copy the data from the intermediate buffer 310 into the graphics object 272.

Figure 4:
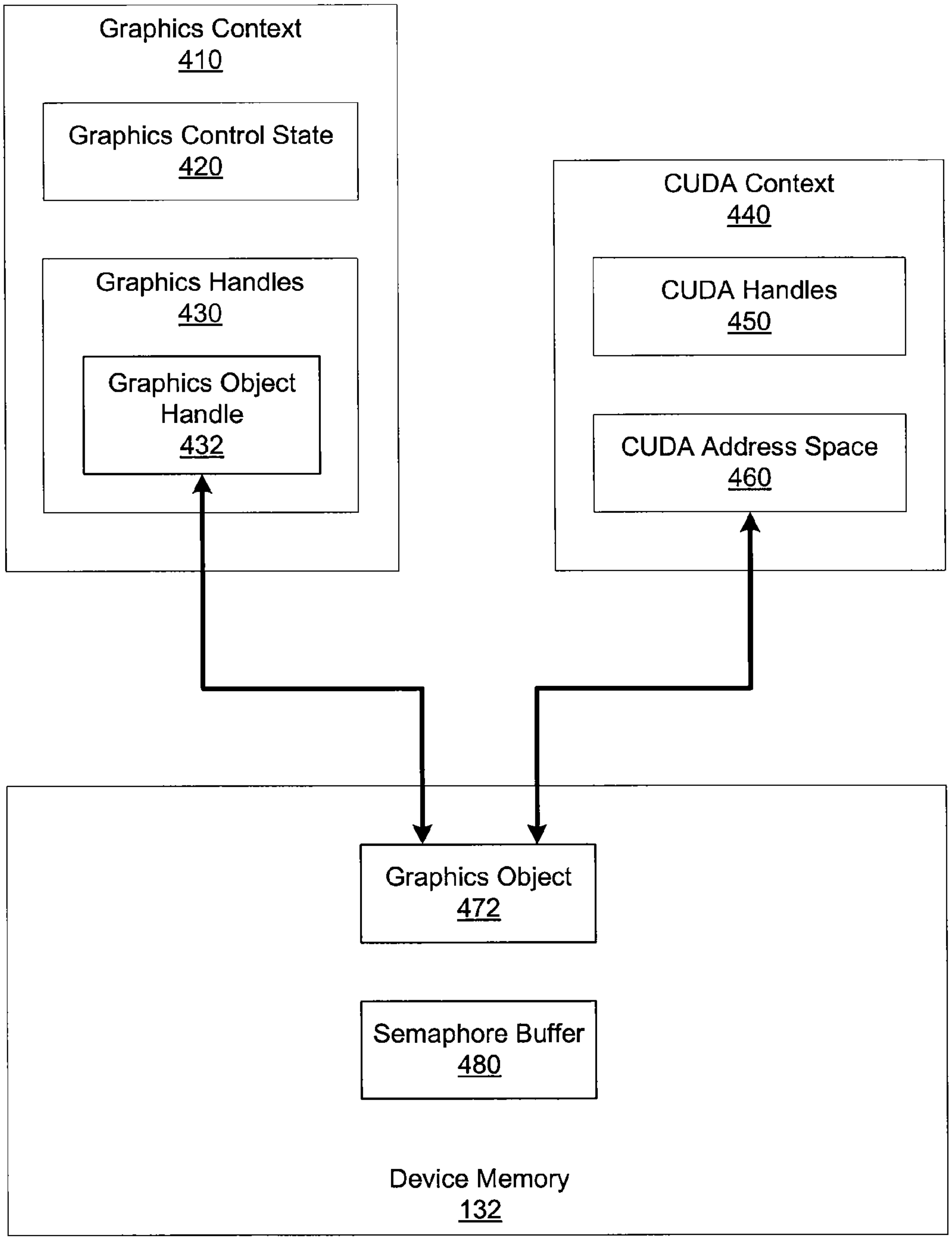
FIG. 4 is a conceptual diagram of a graphics context, a CUDA context, and the device memory of FIG. 1, according to one embodiment of the invention.

FIG. 4 is a conceptual diagram of a graphics context 410, a CUDA context 440, and the device memory 132 of FIG. 1, according to one embodiment of the invention. Again, resources and actions performed within the graphics API 142 are encapsulated inside a particular graphics context 410, and resources and actions performed within the CUDA API 152 are encapsulated inside a particular CUDA context 440. The graphics context 410 includes a graphics control state 420 and graphics handles 430. The graphics handles 430 include a graphics object handle 432. The CUDA context 440 includes CUDA handles 450 and a CUDA address space 460. In various embodiments, the CUDA address space 460 may be a virtual address space or otherwise.

To facilitate the development of application programs that efficiently utilize both the graphics API 142 and the CUDA API 152, the graphics software stack 140 and the CUDA software stack 150 include functionality that enable the software stacks 140 and 150 to inter-operate. More specifically, the software stacks 140 and 150 incorporate techniques that allow the software stacks 140 and 150 to alias and, therefore, share data included in the device memory 132. Further, the software stacks 140 and 150 incorporate techniques that enable the compute device 134 to synchronize access to the shared data.

The device memory 132 includes a graphics object 472 and a semaphore buffer 480. As shown, the graphics object 472 is referenced by the graphics object handle 432 and is also mapped into the CUDA address space 460. Consequently, the graphics object 472 is shared between the graphics software stack 140 and the CUDA software stack 150 and is accessible using either the graphics API 142 or the CUDA API 152. The semaphore buffer 480 is associated with the graphics object 472 and may be used as a control by one or more semaphore mechanisms included in the compute device 134 to enforce mutually exclusive access to the graphics object 472 by the graphics API 142 and the CUDA API 152. The semaphore buffer 480 and associated semaphore mechanisms may be implemented using any protocols known in the art.

Advantageously, mapping the graphics object 472 into the CUDA address space enables the graphics API 142 and the CUDA API 152 to share the graphics object 472 without allocating any additional memory or executing any memory copies. In alternate embodiments, the CUDA API may allocate objects and, subsequently, create an alias (e.g., an object handle) to enable the graphics API to share the object with the CUDA API.

The interoperability functionality is exposed to the application developer through the CUDA API 152. To allow the application developer to further optimize application programs 122, the CUDA API 152 consolidates the heavyweight (i.e., memory-intensive and/or compute-intensive) interoperability setup tasks into a single "register" call that is designed to be executed infrequently. Furthermore, while executing a "register" call, the CUDA API 152 launches tasks that are designed to increase the efficiency of subsequent interoperability calls.

The "register" call is used to enable interoperability functionality for the graphics object 472. Among other things, while executing a "register call," the CUDA API 152 performs synchronization operations, establishes the semaphore associated with the graphics object 472, and maps the graphics object 472 into the CUDA address space 460. Before mapping the graphics object 472 into the CUDA address space 460, the CUDA API 152 launches tasks that evaluate the location of the graphics object 472 and potentially move the graphics object 472 to a location designed to optimize the accesses to the graphics object 472 by both the software stacks 140 and 150. For example, if a graphics object is in the host memory, then the graphics software stack moves the graphics object to the device memory.

Further, still while executing the "register" call, the CUDA API 152 configures the graphics software stack 140 to mark the graphics object 472 as registered for CUDA interoperability. Among other things, marking the graphics object 472 in this fashion influences the memory manager included in the graphics software stack 140 to preferentially retain the graphics object 472 in the device memory 132 at the current location. This procedure reduces the likelihood that the memory manager will move the graphics object 472 to the host memory 120 or to another location in the device memory 132 in response to the needs of any of the application programs 122.

After registering the graphics object 472 for interoperability using the "register call," "map" and "unmap" calls may be used to respectively enable and disable accesses to the graphics object 472 by the CUDA API 152. Since an application program 122 is likely to emit "map" and "unmap" calls at a high frequency, the "map" and "unmap" calls are designed to execute the most common scenarios relatively quickly. While executing a "map" call, the CUDA API 152 first launches a task that determines if the graphics object 472 has been moved since the most recent "register" or "map" call. If the graphics object 472 has not been moved, then the CUDA API 152 configures the CUDA driver 154 and the graphics driver 144 to synchronize the access of the graphics object 472, thereby ensuring that the graphics object 472 is not simultaneously referenced by the CUDA context 440 and the graphics context 450. As described in greater detail in FIG. 5, the CUDA driver 154 and the graphics driver 144 use one or more semaphore mechanisms included in the compute device 134 to perform this synchronization.

Advantageously, since the graphics object 472 is marked as registered for CUDA interoperability, the location of the graphics object 472 will typically remain stationary after the initial "register" call and, consequently, the "map" call executes quickly. More specifically, while executing the "map" call, the CUDA API 152 does not launch any memory mapping operations unless the location of the graphics object 472 has changed since the most recent "register" or "map" call. However, if the graphics object 472 has been moved, then the CUDA API 152 re-registers the graphics object 472 before proceeding with the "map" call.

Similarly, while executing an "unmap" call, the CUDA API 152 configures the CUDA driver 154 and the graphics driver 144 to synchronize the access of the graphics object 472, thereby ensuring that the graphics object 472 is not simultaneously referenced by the CUDA context 440 and the graphics context 450. Again, as described in greater detail in FIG. 5, the CUDA driver 154 and the graphics driver 144 use one or more semaphore mechanisms included in the compute device 134 to perform this synchronization.

Finally, after the application program 122 has completed all the CUDA processing tasks associated with the graphics object 472, an "unregister" call may be used to signal that the application program 122 is no longer using the CUDA API 152 to access the graphics object 472. While executing an "unregister" call, the CUDA API 152 configures the graphics software stack 140 to mark the graphics object 472 as unregistered for CUDA interoperability. Among other things, this allows the graphics software stack 140 to disregard interoperability constraints and restore the standard resource manager policies associated with the graphics object 472.

In alternate embodiments, the interoperability functionality may be exposed to the application developer through the graphics API, or any other programming interface, and may operate on any types of data. Further, data may be allocated and aliased in any technically feasible fashion and subsequent accesses to the shared data may be coordinated using any protocols known in the art.

Figure 5:
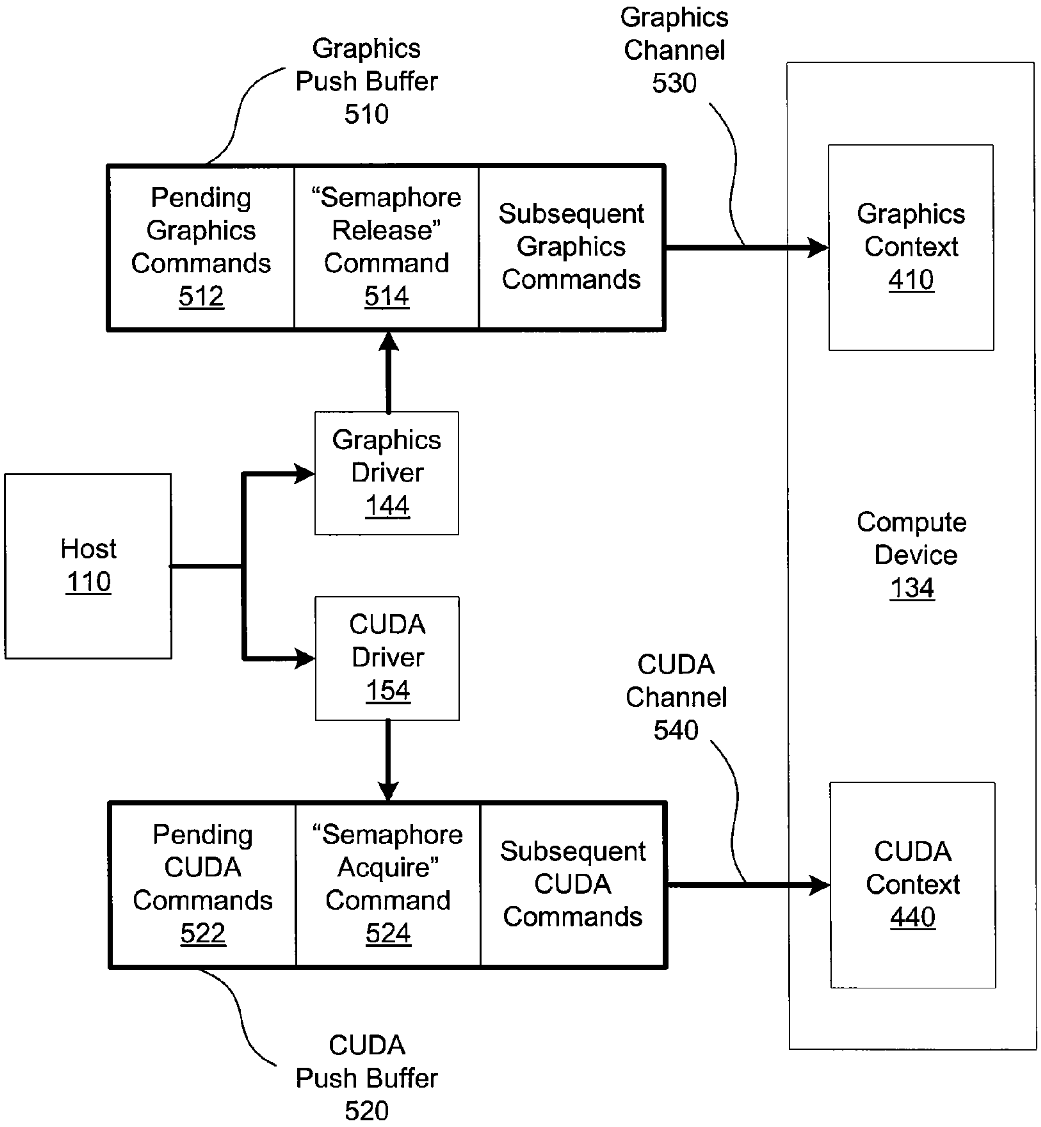
FIG. 5 is a conceptual diagram of a graphics push buffer and a CUDA push buffer, according to one embodiment of the invention.

FIG. 5 is a conceptual diagram of a graphics push buffer 510 and a CUDA push buffer 520, according to one embodiment of the invention. Each of the push buffers 510 and 520 includes a stream of commands designed to configure the compute device 134 to implement calls from the application programs 122. Using the push buffers 510 and 520 enables the host 110 to buffer commands, which allows the host 110 to work independently of the compute device 134, thereby optimizing the overall system performance. Consequently, when the host 110 writes a particular command into one of the push buffers 510 or 520, there may be pending commands in the push buffers 510 and 520 that have not yet been executed by the compute device 134. Further, the host 110 may continue to write subsequent commands into the push buffers 510 and 520.

As the host 110 executes the application program 122, the application program 122 may emit calls using both the graphics API 142 and the CUDA API 152. In response to these calls, the graphics API 142 and the CUDA API 152 configure the graphics driver 144 to append commands to the graphics push buffer 510 and, concurrently, configure the CUDA driver 154 to append commands to the CUDA push buffer 520. The compute device 134 receives the commands included in the graphics push buffer 510 via a graphics channel 530 and encapsulates these commands inside the graphics context 410. Similarly, the compute device 134 receives the commands included in the CUDA push buffer 520 via a CUDA channel 540 and encapsulates these commands inside the CUDA context 440. The compute device 134 reads and executes the commands inside the graphics context 410 and, concurrently, reads and executes the commands inside the CUDA context 440.

To ensure proper execution of the various application programs 122 and to avoid corrupting data, the compute device 134 may be configured to acquire and release semaphores that reside in shared memory locations such as the semaphore residing with the semaphore buffer 480 of FIG. 4. These semaphores synchronize the execution of two or more channels, such as the graphics channel 530 and the CUDA channel 540. For example, a "semaphore acquire" command causes a particular channel to suspend execution until the specified semaphore memory is released, and a "semaphore release" command causes the compute device 134 to release the specified semaphore memory.

The graphics driver 144 and the CUDA driver 154 collaborate using the semaphore mechanism to ensure mutually exclusive access to any shared graphics objects, such as the graphics object 472. Again, when the CUDA API 152 executes the "register" call targeting the graphics object 472, the CUDA API 154 launches tasks that allocate and setup the semaphore buffer 480 that is associated with the graphics object 472. Subsequently, when the CUDA API 152 executes a "map" call, the CUDA API 152 configures the graphics driver 144 to insert a "semaphore release" command 514 into the graphics push buffer 510 and configures the CUDA driver 154 to insert a "semaphore acquire" command 524 into the CUDA push buffer 520. Both the "semaphore release" command 514 and the "semaphore acquire" command 524 reference the semaphore buffer 480. The compute device 134 reads and executes the pending CUDA commands 522. However, the "semaphore acquire" command 524 causes the CUDA channel 540 to suspend further execution until the compute device 134 receives and executes any pending graphics commands 512 (that may reference the graphics object 472) and the "semaphore release" command 514. These synchronization steps ensure that the graphics object 472 is not simultaneously referenced by both the CUDA context 440 and the graphics context 410.

In some embodiments, after inserting the "semaphore release" command 514 into the graphics push buffer 510, the graphics driver 144 may mark the graphics object 472 as inaccessible to the graphics software stack 140. Marking the graphics object 472 in the fashion ensures that the graphics software stack 140 does not access the graphics object 472 while the CUDA software stack 150 is using the graphics object 472.

When the CUDA API 152 executes an "unmap" call (not shown), the CUDA API 142 configures the graphics driver 144 to insert a "semaphore acquire" command into the graphics push buffer 510 and configures the CUDA driver 154 to insert a "semaphore release" command into the CUDA push buffer 520. Upon receiving the "semaphore acquire" command, the graphics channel 530 suspends execution until the compute device 134 executes the CUDA commands preceding the "semaphore release" command and the "semaphore release" command. Again, these synchronization steps ensure that the graphics object 472 is not simultaneously referenced by both the CUDA context 440 and the graphics context 410.

In alternate embodiments, the graphics driver and the CUDA driver may communicate with the compute device in any technically feasible manner, such as inserting different commands into the push buffers or employing a communication technique other than the push buffers.

Figure 6:
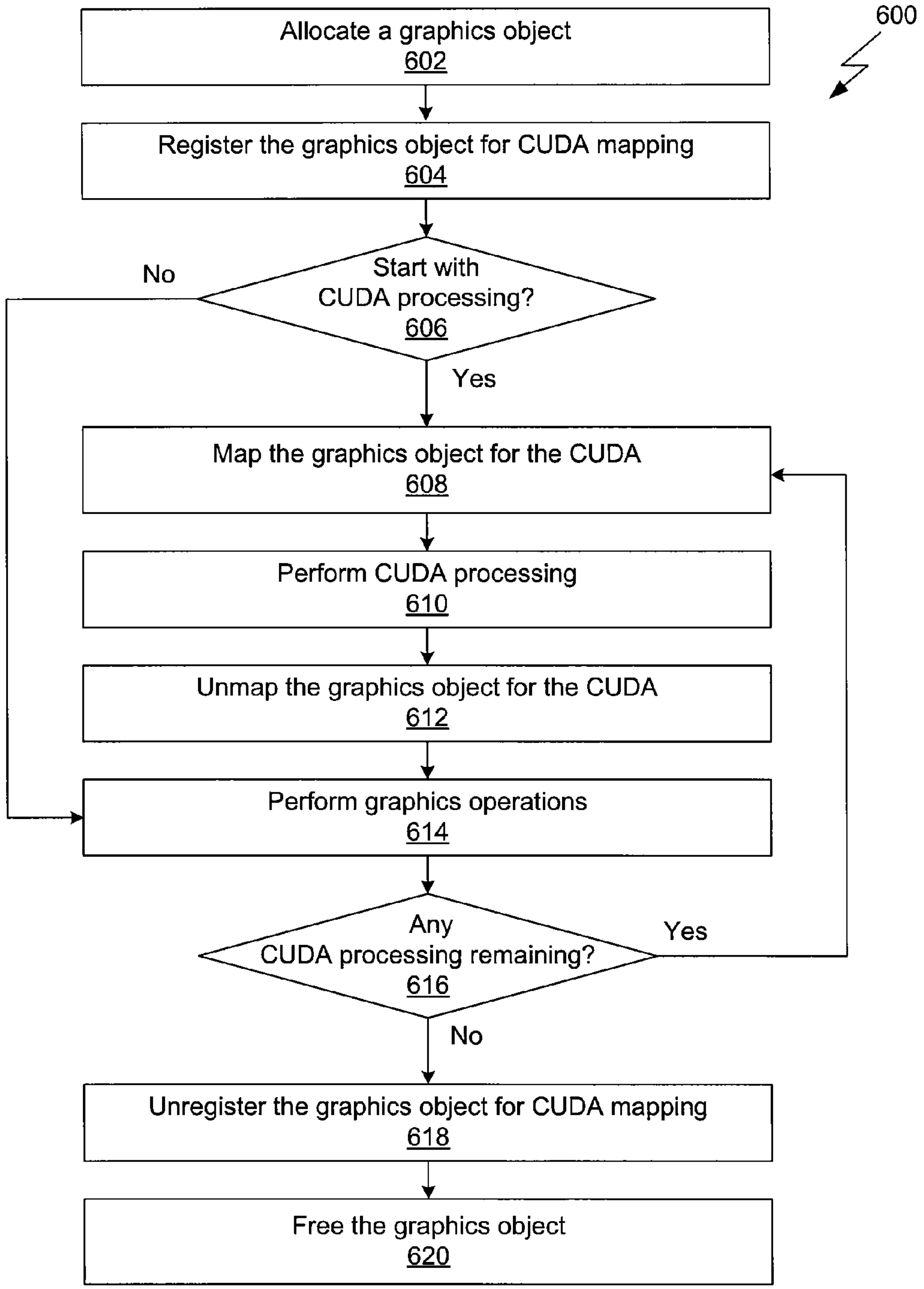
FIG. 6 is a flow diagram of method steps for configuring a compute device to perform CUDA processing and graphics operations, according to one embodiment of the invention.

FIG. 6 is a flow diagram of method steps for configuring a compute device to perform CUDA processing and graphics operations, according to one embodiment of the invention. Although the method steps are described in conjunction with the systems for FIGS. 1, 4, and 5, persons skilled in the art will understand that any system that performs the method steps, in any order, is within the scope of the invention.

As shown, the method 600 begins at step 602, where the application program 122 allocates a graphics object using the graphics API 142. At step 604, the application program 122 registers the graphics object for CUDA mapping by emitting a "register" call. The CUDA API 152 receives and executes the "register" call. As part of step 604, the CUDA API 152 launches tasks that map the graphics object into the CUDA address space 460 and establish a semaphore associated with the graphics object. A series of method steps for registering a graphics object for CUDA mapping is described in greater detail below in FIG. 7. At step 606, if the next API call included in the application program 122 is a call to the graphics API 142, then the method 600 skips steps 608 through 612 and proceeds to step 614. If, at step 606, the next API call included in the application program 122 is a call to the CUDA API 152, then the method 600 proceeds to step 608.

At step 608, the application program 122 maps the graphics object for the CUDA by emitting a "map" call. The CUDA API 152 receives and executes the "map" call. As part of step 608, the CUDA API 152 launches tasks to validate the current mapping of the graphics object into the CUDA memory space. Subsequently, the CUDA API 152 configures the graphics driver 144 and the CUDA driver 154 to use the semaphore established during the "register" call to ensure that the graphics object is not simultaneously referenced by the CUDA context 440 and the graphics context 450. A series of method steps for mapping a graphics object for the CUDA is described in greater detail below in FIG. 8. At step 610, the application program 122 performs CUDA processing using the CUDA API 152. At step 612, the application program 122 unmaps the graphics object for the CUDA by emitting an "unmap" call. The CUDA API 152 receives and executes the "unmap" call. As part of step 612, the CUDA API 152 configures the graphics driver 144 and the CUDA driver 154 to use the semaphore established during the "register" call to ensure that the graphics object is not simultaneously referenced by the CUDA context 440 and the graphics context 450.

At step 614, the application program 122 performs graphics operations using the graphics API 142. At step 616, if the application program 122 includes any more calls to the CUDA API 152, then the method 600 returns to step 608, where the application program 122 again maps the graphics object for the CUDA. The method 600 continues to execute steps 608 through 616, performing CUDA processing and graphics operations using the graphics object, until the application program 122 has performed all the specified CUDA processing and graphics operations.

If, at step 616, the application program 122 does not include any more calls to the CUDA API 152, then the application program 122 proceeds to step 618. At step 618, the application program 122 unregisters the graphics object for CUDA mapping by emitting an "unregister" call. The CUDA API 152 receives and executes the "unregister" call. As part of step 618, the CUDA API 152 disables subsequent "map" and "unmap" calls associated with the graphics object, and notifies the graphics API 142 that CUDA interoperability is no longer required for the graphics object. At step 620, the application program 122 frees the graphics object, and the method 600 terminates.

Figure 7:
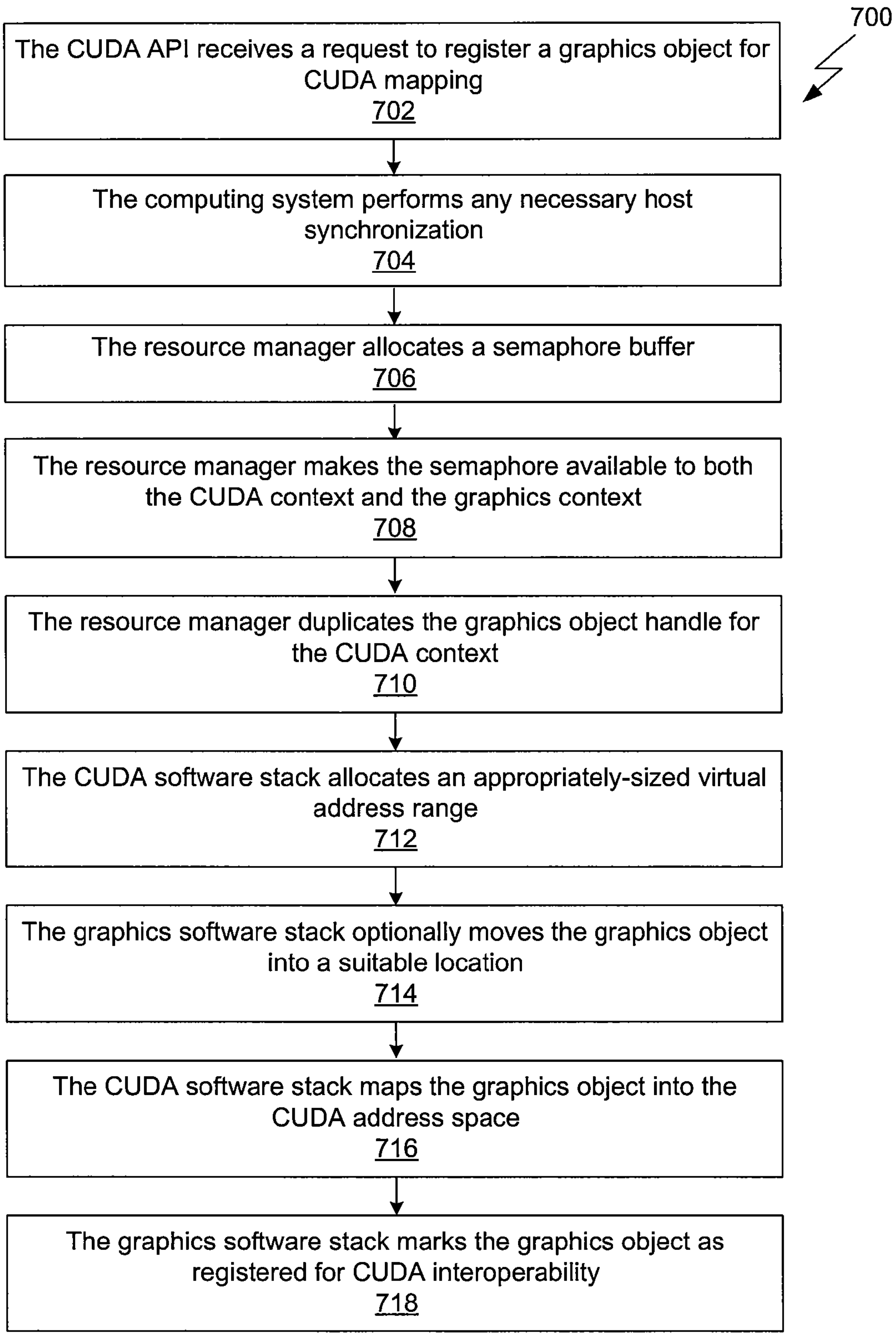
FIG. 7 is a flow diagram of method steps for registering a graphics object for CUDA mapping, according to one embodiment of the invention.

FIG. 7 is a flow diagram of method steps for registering a graphics object for CUDA mapping, according to one embodiment of the invention. Although the method steps are described in conjunction with the systems for FIGS. 1, 4, and 5, persons skilled in the art will understand that any system that performs the method steps, in any order, is within the scope of the invention.

As shown, the method 700 begins at step 702, where the CUDA API 152 receives a request to register a graphics object for CUDA mapping. At step 704, the CUDA API 152 launches tasks that configure the computing system 100 to perform any host synchronization that is necessary to allow the graphics object to be registered for CUDA mapping. At step 706, the CUDA API 152 configures a resource manager to allocate a semaphore buffer that is associated with the graphics object. The semaphore buffer enables the compute device 134 to synchronize between the graphics context 410 and the CUDA context 440. At step 708, the CUDA API 152 further configures the resource manager to make the semaphore available to both the graphics context 410 and the CUDA context 440.

At step 710, the CUDA API 152 configures the resource manager to duplicate the graphics object handle that the graphics context 410 uses to reference the graphics object for the CUDA context 440. At step 712, the CUDA software stack 150 allocates a virtual address range within the CUDA address space 460 that is sized to address the graphics object. At step 714, the CUDA API 152 configures the graphics software stack 140 to analyze the location of the graphics object. After analyzing the location of the graphics object, the graphics software stack 140 may elect to move the graphics object to a more suitable location. For example, the graphics software stack may elect to move the graphics object from the host memory to the device memory. Similarly, the graphics software stack may elect to move the graphics object to a location within the device memory that optimizes subsequent "unmap" and "map" operations. At step 716, the CUDA software stack 150 maps the memory corresponding to the duplicated graphics object handle into the address range in the CUDA address space 460 allocated at step 712. Advantageously, steps 710 through 716 enable the CUDA context 440 to address the same memory as the graphics context 410 without executing any memory copies or allocating any additional memory.

At step 718, the CUDA API 152 configures the graphics software stack 140 to mark the graphics object as registered for CUDA interoperability. By marking the graphics object in this fashion, the graphics software stack 140 influences the memory manager included in the graphics software stack 140 to preferentially retain the graphics object in the device memory 132 at the current location, thereby optimizing subsequent "map" and "unmap" calls.

Figure 8:
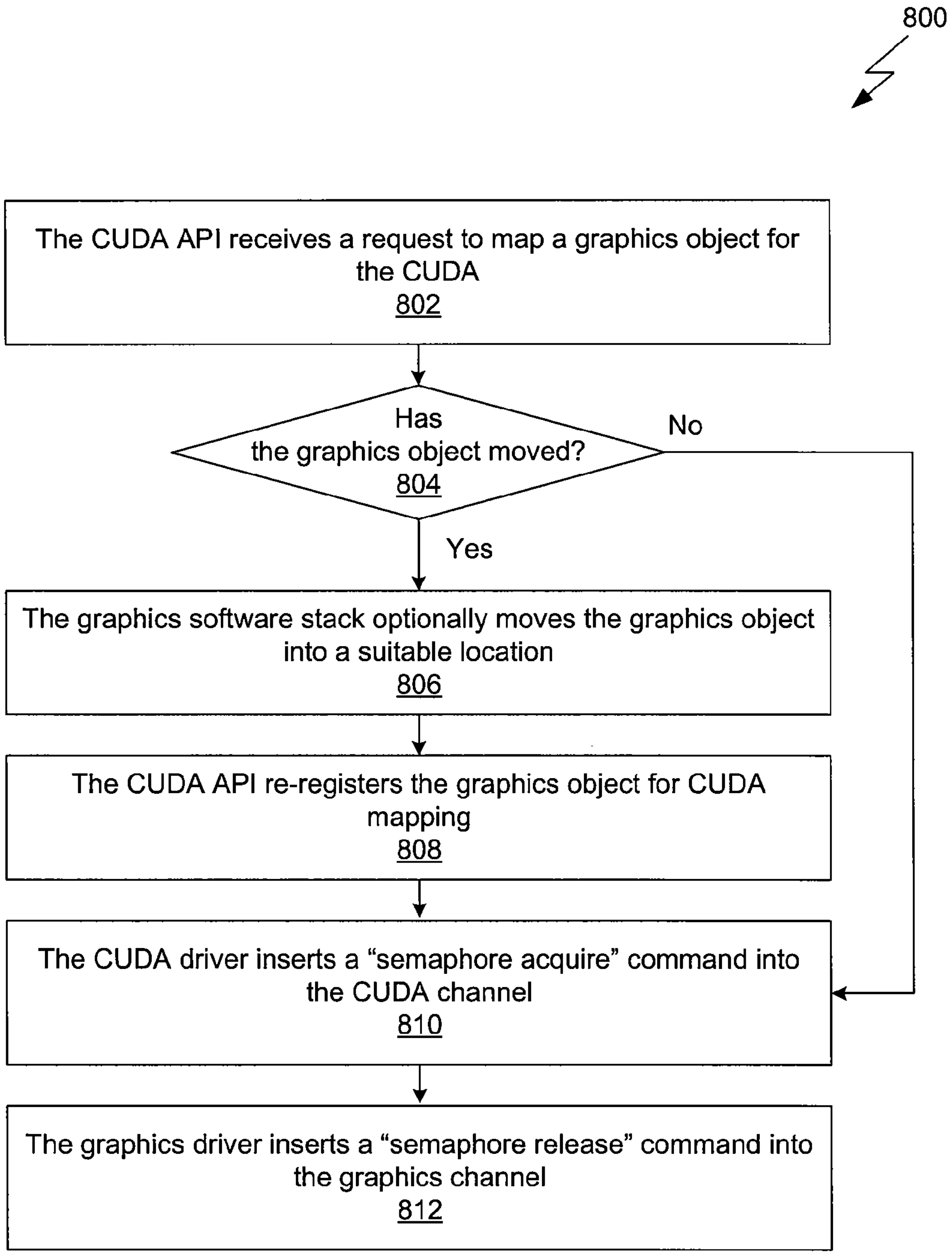
FIG. 8 is a flow diagram of method steps for mapping a graphics object for the CUDA, according to one embodiment of the invention.

FIG. 8 is a flow diagram of method steps for mapping a graphics object for the CUDA, according to one embodiment of the invention. Although the method steps are described in conjunction with the systems for FIGS. 1, 4, and 5, persons skilled in the art will understand that any system that performs the method steps, in any order, is within the scope of the invention.

As shown, the method 800 begins at step 802, where the CUDA API 152 receives a request to map a graphics object for the CUDA. At step 804, if the CUDA API 152 determines that the graphics object has not been moved since the most recent "register" or "map" call, then the method 800 skips steps 806 through 808 and proceeds to step 810. If, at step 804, the CUDA API 152 determines that the graphics object has been moved since the most recent "register" or "map" call, then the method 800 proceeds to step 806. At step 806, the CUDA API 152 configures the graphics software stack 140 to analyze the location of the graphics object. After analyzing the location of the graphics object, the graphics software stack 140 may elect to move the graphics object into a more suitable location. For example, the graphics software stack may elect to move the graphics object from the host memory into the device memory. At step 808, the CUDA API 152 re-registers the graphics object for CUDA mapping, performing the same steps that the CUDA API 152 performs upon receiving a "register" call from the application program 122.

At step 810, the CUDA API 152 configures the CUDA driver 154 to insert a "semaphore acquire" command into the CUDA channel 540. This command references the semaphore buffer that was created when the graphics object was registered for CUDA mapping. The "semaphore acquire" command causes the CUDA channel 540 to suspend execution until the semaphore is released. At step 812, the CUDA API 152 configures the graphics driver 144 to insert a "semaphore release" command into the graphics channel 520.

Again, this command references the semaphore buffer that was created when the graphics object was registered for CUDA mapping. After the compute device 134 executes the "semaphore release" command, the CUDA channel 540 resumes execution. Advantageously, steps 812 and 814 synchronize the access to the graphics object by the CUDA API 152 and the graphics API 142, thereby ensuring that the graphics object is not simultaneously accessed by both the CUDA API 152 and the graphics API 142.

In sum, an application developer may tailor an application program to efficiently utilize multiple APIs to seamlessly interoperate on shared data by including interoperability calls. In one embodiment, the CUDA API, the CUDA driver, and the graphics driver are enhanced to enable the specification and execution of these interoperability calls. When an application program emits a "register" call, the CUDA API ensures that the targeted graphics object is accessible to the CUDA. Among other things, while executing the "register" call, the CUDA API launches heavy-weight tasks, such as ensuring that the graphics object is in the device memory and mapping the graphics object into the CUDA address space. Further, a resource manager allocates a semaphore buffer in the device memory. Subsequently, when the application program emits "map" and "unmap" calls, the CUDA API launches typically lighter-weight tasks that respectively enable and disable CUDA API access to the graphics object. Moreover, while executing the "map" and "unmap" calls, the CUDA API configures the CUDA driver and the graphics driver to use the semaphore buffer in conjunction with the semaphore mechanisms in the compute device to synchronize the access to the graphics object. Finally, when the application program emits an "unregister" call, the CUDA API disables subsequent "map" and "unmap" calls, and notifies the graphics API that CUDA interoperability is no longer required for the graphics object.

Advantageously, mapping the graphics object into the CUDA address space allows application programs to use both the graphics API and the CUDA API to access the data in the graphics object without allocating additional buffers or copying data. Moreover, using one or more semaphore mechanisms to synchronize access to the graphics object enables the compute device to efficiently ensure exclusive access to the graphics object. Finally, by partitioning the tasks involved in sharing the graphics object into a heavy-weight "register" call and typically lighter-weight "map" and "unmap" calls, the CUDA API allows application developers to further optimize the performance of application programs.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

We claim:

1. A method for accessing a shared memory in a system having multiple application programming interfaces (APIs), the method comprising:

registering a memory buffer that resides in a memory space and is accessible by at least two APIs of the multiple APIs, wherein a memory manager is configured to retain the memory buffer in the memory space to allow the at least two APIs to access the memory buffer while the memory buffer is registered and not move the memory buffer to a host memory space;

requesting access to the memory buffer;

requesting modifications to resource policies associated with the memory buffer to retain the memory buffer at a location accessible by the at least two APIs;

synchronizing access to the memory buffer among the at least two APIs using a semaphore mechanism for purposes of accessing the memory buffer; and generating one or more calls that cause a processing unit to operate on data stored in the memory buffer.

2. The method of claim 1, wherein the step of registering the memory buffer comprises causing an alias to the memory buffer to be created, the alias providing alternative access to the memory buffer.

3. The method of claim 1, further comprising the steps of:

receiving a request from a first API of the at least two APIs to access the memory buffer; and synchronizing access to the memory buffer among the at least two APIs using a semaphore mechanism to allow the first API to access the memory buffer.

4. The method of claim 1, wherein the processing unit comprises a graphics processing unit.

5. A method for accessing a shared memory in a system having multiple application programming interfaces (APIs), the method comprising:

registering a memory buffer that resides in a memory space and is accessible by at least two APIs of the multiple APIs, wherein a memory manager is configured to retain the memory buffer in the memory space to allow the at least two APIs to access the memory buffer while the memory buffer is registered and not move the memory buffer to a host memory space, wherein the step of registering the memory buffer further comprises the steps of:

determining if a current location of the memory buffer is accessible by the at least two APIs; and causing the memory buffer to be moved to another location accessible by the multiple APIs, if the current location is not accessible by the at least two APIs;

requesting access to the memory buffer;

synchronizing access to the memory buffer among the at least two APIs using a semaphore mechanism for purposes of accessing the memory buffer; and generating one or more calls that cause a processing unit to operate on data stored in the memory buffer.

6. A method for accessing a shared memory in a system having multiple application programming interfaces (APIs), the method comprising:

registering a memory buffer that resides in a memory space and is accessible by at least two APIs of the multiple APIs, wherein a memory manager is configured to retain the memory buffer in the memory space to allow the at least two APIs to access the memory buffer while the memory buffer is registered and not move the memory buffer to a host memory space, wherein the step of requesting access to the memory buffer further comprises the steps of:

determining if the memory buffer has been moved since being previously mapped into the address space; and re-registering the memory buffer for address mapping, if the memory buffer has been moved since being previously mapped into the address space;

requesting access to the memory buffer;

synchronizing access to the memory buffer among the at least two APIs using a semaphore mechanism for purposes of accessing the memory buffer; and generating one or more calls that cause a processing unit to operate on data stored in the memory buffer.

7. A non-transitory computer-readable medium including instructions that, when executed by a first processing unit, cause the first programming unit to access a shared memory in a system having multiple application programming interfaces (APIs), by performing the steps of:

registering a memory buffer that resides in a memory space and is accessible by at least two APIs of the multiple APIs, wherein a memory manager is configured to retain the memory buffer in the memory space to allow the at least two APIs to access the memory buffer while the memory buffer is registered and not move the memory buffer to a host memory space;

requesting access to the memory buffer;

requesting modifications to resource policies associated with the memory buffer to retain the memory buffer at a location accessible by the at least two APIs;

synchronizing access to the memory buffer among the at least two APIs using a semaphore mechanism for purposes of accessing the memory buffer; and generating one or more calls that cause a second processing unit to operate on data stored in the memory buffer.

8. The computer-readable medium of claim 7, wherein the step of registering the memory buffer comprises causing an alias to the memory buffer to be created, the alias providing alternative access to the memory buffer.

9. The computer-readable medium of claim 7, further comprising the steps of:

receiving a request from a first API in the at least two APIs to access the memory buffer; and synchronizing access to the memory buffer among the at least two APIs using a semaphore mechanism to allow the first API to access the memory buffer.

10. The computer-readable medium of claim 7, wherein the second processing unit comprises a graphics processing unit.

11. A non-transitory computer-readable medium including instructions that, when executed by a first processing unit, cause the first programming unit to access a shared memory in a system having multiple application programming interfaces (APIs), by performing the steps of:

registering a memory buffer that resides in a memory space and is accessible by at least two APIs of the multiple APIs, wherein a memory manager is configured to retain the memory buffer in the memory space to allow the at least two APIs to access the memory buffer while the memory buffer is registered and not move the memory buffer to a host memory space, wherein the step of registering the memory buffer further comprises the steps of:

determining if a current location of the memory buffer is accessible by the at least two APIs; and causing the memory buffer to be moved to another location accessible by the at least two APIs, if the current location is not accessible by the at least two APIs;

requesting access to the memory buffer;

synchronizing access to the memory buffer among the at least two APIs using a semaphore mechanism for purposes of accessing the memory buffer; and generating one or more calls that cause a second processing unit to operate on data stored in the memory buffer.

12. A non-transitory computer-readable medium including instructions that, when executed by a first processing unit, cause the first programming unit to access a shared memory in a system having multiple application programming interfaces (APIs), by performing the steps of:

registering a memory buffer that resides in a memory space and is accessible by at least two APIs of the multiple APIs, wherein a memory manager is configured to retain the memory buffer in the memory space to allow the at least two APIs to access the memory buffer while the memory buffer is registered and not move the memory buffer to a host memory space;

requesting access to the memory buffer, wherein the step of requesting access to the memory buffer further comprises the steps of:

determining if the memory buffer has been moved since being previously mapped into the address space; and re-registering the memory buffer for address mapping, if the memory buffer has been moved since being previously mapped into the address space;

synchronizing access to the memory buffer among the at least two APIs using a semaphore mechanism for purposes of accessing the memory buffer; and generating one or more calls that cause a second processing unit to operate on data stored in the memory buffer.

13. A computing device configured to access a shared memory in a system having multiple application programming interfaces (APIs), the computing device comprising:

a processing unit;

a graphics processing unit (GPU) coupled to the processing unit;

a first API of the multiple APIs; and a second API of the multiple APIs that is configured to:

register a memory buffer that resides in a memory space and is accessible by the first API and the second API of the multiple APIs, wherein a memory manager is configured to retain the memory buffer in the memory space to allow the first API and the second API to access the memory buffer while the memory buffer is registered and not move the memory buffer to a host memory space, wherein, to register the memory buffer, the second API is configured to:

determine if a current location of the memory buffer is accessible by both the first API and the second API; and cause the memory buffer to be moved to another location accessible by both the first API and the second API, if the current location is not accessible by both the first API and the second API;

request access to the memory buffer;

synchronize access to the memory buffer between the first API and the second API using a semaphore mechanism for purposes of accessing the memory buffer; and generate one or more calls that cause the GPU to operate on data stored in the memory buffer.

14. A computing device configured to access a shared memory in a system having multiple application programming interfaces (APIs), the computing device comprising:

a processing unit;

a graphics processing unit (GPU) coupled to the processing unit;

a first API of the multiple APIs; and a second API of the multiple APIs that is configured to:

register a memory buffer that resides in a memory space and is accessible by the first API and the second API of the multiple APIs, wherein a memory manager is configured to retain the memory buffer in the memory space to allow the first API and the second API to access the memory buffer while the memory buffer is registered and not move the memory buffer to a host memory space;

request access to the memory buffer, wherein, to request access to the memory buffer, the second API is configured to:

determine if the memory buffer has been moved since being previously mapped into the address space; and re-register the memory buffer for address mapping, if the memory buffer has been moved since being previously mapped into the address space;

synchronize access to the memory buffer between the first API and the second API using a semaphore mechanism for purposes of accessing the memory buffer; and generate one or more calls that cause the GPU to operate on data stored in the memory buffer.

15. A method for accessing a shared memory in a system having multiple application programming interfaces (APIs), the method comprising:

registering a memory buffer that resides in a memory space by allocating, to each API included in the multiple APIs, a virtual address range within an address space associated with the API, wherein the API is able to access the memory buffer via the virtual address range allocated to the API, determining if a current location of the memory buffer is accessible by the multiple APIs, and causing the memory buffer to be moved to another location accessible by the multiple APIs, if the current location is not accessible by the multiple APIs, and wherein a memory manager is configured to retain the memory buffer in the memory space to allow the API to access the memory buffer while the memory buffer is registered and registering the memory buffer comprises causing an alias to the memory buffer to be created, the alias providing alternative access to the memory buffer;

requesting access to the memory buffer;

synchronizing access to the memory buffer among two or more of the APIs in the multiple APIs using a semaphore mechanism for purposes of accessing the memory buffer; and generating one or more calls that cause a processing unit to operate on data stored in the memory buffer.

16. A method for accessing a shared memory in a system having multiple application programming interfaces (APIs), the method comprising:

registering a memory buffer that resides in a memory space by allocating, to each API included in the multiple APIs, a virtual address range within an address space associated with the API, wherein the API is able to access the memory buffer via the virtual address range allocated to the API, and wherein a memory manager is configured to retain the memory buffer in the memory space to allow the API to access the memory buffer while the memory buffer is registered;

requesting access to the memory buffer by determining if the memory buffer has been moved since being previously mapped into the address space, and re-registering the memory buffer for address mapping, if the memory buffer has been moved since being previously mapped into the address space;

synchronizing access to the memory buffer among two or more of the APIs in the multiple APIs using a semaphore mechanism for purposes of accessing the memory buffer; and generating one or more calls that cause a processing unit to operate on data stored in the memory buffer.

17. The method of claim 16, further comprising the step of requesting modifications to resource policies associated with the memory buffer to retain the memory buffer at a location accessible by the multiple APIs.

18. A computer-readable medium including instructions that, when executed by a first processing unit, cause the first programming unit to access a shared memory in a system having multiple application programming interfaces (APIs), by performing the steps of:

registering a memory buffer that resides in a memory space by allocating, to each API included in the multiple APIs, a virtual address range within an address space associated with the API, wherein the API is able to access the memory buffer via the virtual address range allocated to the API, determining if a current location of the memory buffer is accessible by the multiple APIs, and causing the memory buffer to be moved to another location accessible by the multiple APIs, if the current location is not accessible by the multiple APIs, and wherein a memory manager is configured to retain the memory buffer in the memory space to allow the API to access the memory buffer while the memory buffer is registered and registering the memory buffer comprises causing an alias to the memory buffer to be created, the alias providing alternative access to the memory buffer;

requesting access to the memory buffer;

synchronizing access to the memory buffer among two or more of the APIs in the multiple APIs using a semaphore mechanism for purposes of accessing the memory buffer; and generating one or more calls that cause a processing unit to operate on data stored in the memory buffer.

19. A computer-readable medium including instructions that, when executed by a first processing unit, cause the first programming unit to access a shared memory in a system having multiple application programming interfaces (APIs), by performing the steps of:

registering a memory buffer that resides in a memory space by allocating, to each API included in the multiple APIs, a virtual address range within an address space associated with the API, wherein the API is able to access the memory buffer via the virtual address range allocated to the API, and wherein a memory manager is configured to retain the memory buffer in the memory space to allow the API to access the memory buffer while the memory buffer is registered;

requesting access to the memory buffer by determining if the memory buffer has been moved since being previously mapped into the address space, and re-registering the memory buffer for address mapping, if the memory buffer has been moved since being previously mapped into the address space;

synchronizing access to the memory buffer among two or more of the APIs in the multiple APIs using a semaphore mechanism for purposes of accessing the memory buffer; and generating one or more calls that cause a processing unit to operate on data stored in the memory buffer.

20. The computer-readable medium of claim 19, further comprising the step of requesting modifications to resource policies associated with the memory buffer to retain the memory buffer at a location accessible by the multiple APIs.

21. A computing device configured to access a shared memory in a system having multiple application programming interfaces (APIs), the computing device comprising:

a processing unit;

a graphics processing unit (GPU) coupled to the processing unit;

a first API of the multiple APIs; and a second API of the multiple APIs that is configured to:

register a memory buffer that resides in a memory space by allocating, to each API included in the multiple APIs, a virtual address range within an address space associated with the API, wherein the API is able to access the memory buffer via the virtual address range allocated to the API, and wherein a memory manager is configured to retain the memory buffer in the memory space to allow the API to access the memory buffer while the memory buffer is registered, and wherein the second API is configured to:

determine if a current location of the memory buffer is accessible by both the first API and the second API, and cause the memory buffer to be moved to another location accessible by both the first API and the second API, if the current location is not accessible by both the first API and the second API;

request access to the memory buffer, synchronize access to the memory buffer between the first API and the second API using a semaphore mechanism for purposes of accessing the memory buffer, and generate one or more calls that cause the GPU to operate on data stored in the memory buffer.

22. A computing device configured to access a shared memory in a system having multiple application programming interfaces (APIs), the computing device comprising:

a processing unit;

a graphics processing unit (GPU) coupled to the processing unit;

a first API of the multiple APIs; and a second API of the multiple APIs that is configured to:

register a memory buffer that resides in a memory space by allocating, to each API included in the multiple APIs, a virtual address range within an address space associated with the API, wherein the API is able to access the memory buffer via the virtual address range allocated to the API, and wherein a memory manager is configured to retain the memory buffer in the memory space to allow the API to access the memory buffer while the memory buffer is registered, request access to the memory buffer, synchronize access to the memory buffer between the first API and the second API using a semaphore mechanism for purposes of accessing the memory buffer, generate one or more calls that cause the GPU to operate on data stored in the memory buffer, determine if the memory buffer has been moved since being previously mapped into the address space, and re-register the memory buffer for address mapping, if the memory buffer has been moved since being previously mapped into the address space.

* * * * *